(12) United States Patent
Bergdale et al.

(10) Patent No.: US 11,556,863 B2
(45) Date of Patent: Jan. 17, 2023

(54) METHOD AND SYSTEM FOR DISTRIBUTING ELECTRONIC TICKETS WITH VISUAL DISPLAY FOR VERIFICATION

(71) Applicant: Bytemark, Inc., New York, NY (US)

(72) Inventors: Micah Bergdale, New York, NY (US); Matthew Grasser, New York, NY (US); Christopher Guess, Brooklyn, NY (US); Nicholas Ihm, Brooklyn, NY (US); Samuel Krueckeberg, New York, NY (US); Gregory Valyer, Highland Park, IL (US)

(73) Assignee: Bytemark, Inc., New York, NY (US)

( * ) Notice: Subject to any disclaimer, the term of this patent is extended or adjusted under 35 U.S.C. 154(b) by 810 days.

(21) Appl. No.: 15/485,581

(22) Filed: Apr. 12, 2017

(65) Prior Publication Data

US 2017/0220960 A1  Aug. 3, 2017

Related U.S. Application Data

(63) Continuation of application No. 13/110,709, filed on May 18, 2011, now abandoned.

(51) Int. Cl.
*G06Q 10/02* (2012.01)
*G06Q 20/32* (2012.01)
(Continued)

(52) U.S. Cl.
CPC .......... *G06Q 10/02* (2013.01); *G06F 21/602* (2013.01); *G06Q 20/0457* (2013.01);
(Continued)

(58) Field of Classification Search
CPC ... G06Q 20/0457; G06Q 10/02; G06F 21/602
See application file for complete search history.

(56) References Cited

U.S. PATENT DOCUMENTS

| 4,193,114 A | 3/1980 | Benini |
| 5,253,166 A | 10/1993 | Dettelbach |

(Continued)

FOREIGN PATENT DOCUMENTS

| EP | 1439495 A1 | 7/2004 |
| GB | 2390211 | 12/2003 |

(Continued)

OTHER PUBLICATIONS

Destroy. (2007). In R.E. Allen (Ed.), The penguin English Dictionary. (3rd ed.). [Online], London: Penguin. Available from: https://search.credoreference.com/content/entry/penguineng/destroy/0?institutionId=743 [Accessed May 21, 2022], (Year: 2007).*

(Continued)

*Primary Examiner* — Abhishek Vyas
*Assistant Examiner* — Monica A Mandel

(57) ABSTRACT

This invention discloses a novel system and method for distributing electronic ticketing such that the ticket is verified at the entrance to venues by means of an animation or other human perceptible verifying visual object that is selected by the venue for the specific event. Tins removes the need to use a bar-code scanner on an LCD display of a cell phone or other device and speeds up the rate at which human ticket takers can verify ticket holders.

50 Claims, 12 Drawing Sheets

(51) Int. Cl.
*G06Q 20/04* (2012.01)
*G07B 15/00* (2011.01)
*G06Q 20/38* (2012.01)
*G06Q 20/40* (2012.01)
*G06F 21/60* (2013.01)

(52) U.S. Cl.
CPC ..... *G06Q 20/3274* (2013.01); *G06Q 20/3827* (2013.01); *G06Q 20/4016* (2013.01); *G07B 15/00* (2013.01); *G06Q 2220/00* (2013.01)

(56) References Cited

U.S. PATENT DOCUMENTS

| | | |
|---|---|---|
| 5,465,084 A | 11/1995 | Cottrell |
| 5,559,961 A | 9/1996 | Blonder |
| 5,590,038 A | 12/1996 | Pitroda |
| 5,621,797 A | 4/1997 | Rosen |
| 5,777,305 A | 7/1998 | Smith |
| 5,789,732 A | 8/1998 | McMahon |
| 5,797,330 A | 8/1998 | Li |
| 5,907,830 A | 5/1999 | Engel |
| 5,918,909 A | 7/1999 | Fiala |
| 6,023,679 A | 2/2000 | Acebo |
| 6,023,688 A | 2/2000 | Ramachandran |
| 6,085,976 A | 7/2000 | Sehr |
| 6,175,922 B1 | 1/2001 | Wang |
| 6,251,017 B1 | 6/2001 | Leason |
| 6,315,195 B1 | 11/2001 | Ramachandran |
| 6,373,587 B1 | 4/2002 | Sansone |
| 6,393,305 B1 | 5/2002 | Ulvinen |
| 6,454,174 B1 | 9/2002 | Sansone |
| 6,473,739 B1 | 10/2002 | Showghi |
| 6,484,182 B1 | 11/2002 | Dunphy |
| 6,493,110 B1 | 12/2002 | Roberts |
| 6,496,809 B1 | 12/2002 | Nakfoor |
| 6,685,093 B2 | 2/2004 | Challa |
| 6,775,539 B2 | 8/2004 | Deshpande |
| 6,961,858 B2 | 11/2005 | Fransdonk |
| 6,997,384 B2 | 2/2006 | Hara |
| 7,017,806 B2 | 3/2006 | Peterson |
| 7,020,635 B2 | 3/2006 | Hamilton |
| 7,024,807 B2 | 4/2006 | Street |
| 7,044,362 B2 | 5/2006 | Yu |
| 7,080,049 B2 | 7/2006 | Truitt |
| 7,090,128 B2 | 8/2006 | Farley |
| 7,093,130 B1 | 8/2006 | Kobayashi |
| 7,103,572 B1 | 9/2006 | Kawaguchi |
| 7,107,462 B2 | 9/2006 | Fransdonk |
| 7,134,087 B2 | 11/2006 | Bushold |
| 7,150,045 B2 | 12/2006 | Koelle |
| 7,158,939 B2 | 1/2007 | Goldstein |
| 7,174,462 B2 | 2/2007 | Pering |
| 7,191,221 B2 | 3/2007 | Schatz |
| 7,263,506 B2 | 8/2007 | Lee |
| 7,315,944 B2 | 1/2008 | Dutta |
| 7,386,517 B1 | 6/2008 | Donner |
| 7,392,226 B1 | 6/2008 | Sasaki |
| 7,395,506 B2 | 7/2008 | Tan |
| 7,493,261 B2 | 2/2009 | Chen |
| 7,520,427 B2 | 4/2009 | Boyd |
| 7,529,934 B2 | 5/2009 | Fujisawa |
| 7,555,284 B2 | 6/2009 | Yan |
| 7,567,910 B2 | 7/2009 | Hasegawa |
| 7,587,502 B2 | 9/2009 | Crawford |
| 7,617,975 B2 | 11/2009 | Wada |
| 7,711,586 B2 | 5/2010 | Aggarwal |
| 7,933,589 B1 | 4/2011 | Mamdani |
| 7,967,211 B2 | 6/2011 | Challa |
| 8,010,128 B2 | 8/2011 | Silverbrook |
| 8,016,187 B2 | 9/2011 | Frantz |
| 8,019,365 B2 | 9/2011 | Fisher |
| 8,370,180 B2 | 2/2013 | Scott |
| 8,379,874 B1 | 2/2013 | Simon |
| 8,457,354 B1 | 6/2013 | Kolar |
| 8,473,342 B1 | 6/2013 | Roberts |
| 8,558,693 B2 * | 10/2013 | Martin ................. G06Q 10/109 |
| | | 340/539.13 |
| 8,583,511 B2 | 11/2013 | Hendrickson |
| 8,584,224 B1 | 11/2013 | Pei |
| 8,788,836 B1 | 7/2014 | Hernacki |
| 8,912,879 B2 | 12/2014 | Fyke |
| 8,935,802 B1 | 1/2015 | Mattsson |
| 2001/0005840 A1 | 6/2001 | Verkama |
| 2001/0014870 A1 | 8/2001 | Saito |
| 2001/0016825 A1 | 8/2001 | Pugliese |
| 2001/0017584 A1 * | 8/2001 | Shinzaki ................. G06F 21/32 |
| | | 340/5.52 |
| 2001/0037174 A1 | 11/2001 | Dickerson |
| 2001/0044324 A1 | 11/2001 | Carayiannis |
| 2001/0051787 A1 | 12/2001 | Haller |
| 2001/0052545 A1 | 12/2001 | Serebrennikov |
| 2001/0054111 A1 | 12/2001 | Lee |
| 2002/0010603 A1 | 1/2002 | Doi |
| 2002/0016929 A1 | 2/2002 | Harashima |
| 2002/0023027 A1 | 2/2002 | Simonds |
| 2002/0040308 A1 | 4/2002 | Hasegawa |
| 2002/0040346 A1 | 4/2002 | Kwan |
| 2002/0060246 A1 | 5/2002 | Gobburu |
| 2002/0065713 A1 | 5/2002 | Awada |
| 2002/0065783 A1 | 5/2002 | Na |
| 2002/0090930 A1 | 7/2002 | Fujiwara |
| 2002/0094090 A1 | 7/2002 | Lino |
| 2002/0126780 A1 | 9/2002 | Oshima |
| 2002/0138346 A1 | 9/2002 | Kodaka |
| 2002/0145505 A1 | 10/2002 | Sata |
| 2002/0184539 A1 | 12/2002 | Fukuda |
| 2002/0196274 A1 | 12/2002 | Comfort |
| 2003/0014315 A1 * | 1/2003 | Jaalinoja ............... G06Q 20/045 |
| | | 705/18 |
| 2003/0036929 A1 | 2/2003 | Vaughan |
| 2003/0066883 A1 | 4/2003 | Yu |
| 2003/0069763 A1 | 4/2003 | Gathman |
| 2003/0069827 A1 | 4/2003 | Gathman |
| 2003/0093695 A1 | 5/2003 | Dutta |
| 2003/0105641 A1 | 6/2003 | Lewis |
| 2003/0105954 A1 | 6/2003 | Immonen |
| 2003/0105969 A1 | 6/2003 | Matsui |
| 2003/0120611 A1 * | 6/2003 | Yoshino ................. G06F 21/10 |
| | | 705/67 |
| 2003/0144035 A1 * | 7/2003 | Weinblatt ............... G06Q 30/02 |
| | | 455/566 |
| 2003/0154169 A1 | 8/2003 | Yanai |
| 2003/0163787 A1 | 8/2003 | Hay |
| 2003/0172037 A1 | 9/2003 | Jung |
| 2003/0200184 A1 | 10/2003 | Dominguez |
| 2003/0229790 A1 | 12/2003 | Russell |
| 2003/0233276 A1 | 12/2003 | Pearlman |
| 2004/0019564 A1 | 1/2004 | Goldthwaite |
| 2004/0019792 A1 | 1/2004 | Funamoto |
| 2004/0030081 A1 | 2/2004 | Hegi |
| 2004/0030091 A1 | 2/2004 | McCullough |
| 2004/0030658 A1 | 2/2004 | Cruz |
| 2004/0039635 A1 | 2/2004 | Linde |
| 2004/0085351 A1 | 5/2004 | Tokkonen |
| 2004/0101158 A1 | 5/2004 | Butler |
| 2004/0111373 A1 | 6/2004 | Iga |
| 2004/0128509 A1 | 7/2004 | Gehrmann |
| 2004/0148253 A1 | 7/2004 | Shin |
| 2004/0169589 A1 | 9/2004 | Lea |
| 2004/0186884 A1 | 9/2004 | Dutordoir |
| 2004/0210476 A1 | 10/2004 | Blair |
| 2004/0224703 A1 | 11/2004 | Takaki |
| 2004/0250138 A1 | 12/2004 | Schneider |
| 2005/0041667 A1 * | 2/2005 | Miller .................... H04L 12/56 |
| | | 370/395.4 |
| 2005/0059339 A1 | 3/2005 | Honda |
| 2005/0060554 A1 | 3/2005 | ODonoghue |
| 2005/0070257 A1 | 3/2005 | Saarinen |
| 2005/0108912 A1 | 5/2005 | Bekker |
| 2005/0109838 A1 | 5/2005 | Linlor |
| 2005/0111723 A1 | 5/2005 | Hannigan |
| 2005/0116030 A1 | 6/2005 | Wada |
| 2005/0137889 A1 | 6/2005 | Wheeler |
| 2005/0204140 A1 | 9/2005 | Maruyama |

(56) References Cited

U.S. PATENT DOCUMENTS

| | | |
|---|---|---|
| 2005/0212760 A1 | 9/2005 | Marvit |
| 2005/0240589 A1 | 10/2005 | Altenhofen |
| 2005/0246634 A1 | 11/2005 | Ortwein |
| 2005/0252964 A1 | 11/2005 | Takaki |
| 2005/0253817 A1 | 11/2005 | Rytivaara |
| 2005/0272473 A1 | 12/2005 | Sheena |
| 2005/0283444 A1 | 12/2005 | Ekberg |
| 2006/0120607 A1 | 6/2006 | Lev |
| 2006/0161446 A1 | 7/2006 | Fyfe |
| 2006/0174339 A1 | 8/2006 | Tao |
| 2006/0206724 A1 | 9/2006 | Schaufele |
| 2006/0206728 A1 | 9/2006 | Masuda |
| 2006/0293929 A1 | 12/2006 | Wu |
| 2007/0012765 A1 | 1/2007 | Trinquet |
| 2007/0017979 A1 | 1/2007 | Wu |
| 2007/0022058 A1 | 1/2007 | Labrou |
| 2007/0032225 A1 | 2/2007 | Konicek |
| 2007/0136213 A1 | 6/2007 | Sansone |
| 2007/0150842 A1 | 6/2007 | Chaudhri |
| 2007/0156443 A1 | 7/2007 | Gurvey |
| 2007/0192590 A1 | 8/2007 | Pomerantz |
| 2007/0215687 A1 | 9/2007 | Waltman |
| 2007/0260543 A1 | 11/2007 | Chappuis |
| 2007/0265891 A1 | 11/2007 | Guo |
| 2007/0271455 A1 | 11/2007 | Nakano |
| 2007/0273514 A1 | 11/2007 | Winand |
| 2007/0276944 A1 | 11/2007 | Samovar |
| 2007/0283049 A1 | 12/2007 | Rakowski |
| 2007/0288319 A1 | 12/2007 | Robinson |
| 2008/0007388 A1 | 1/2008 | Au |
| 2008/0015983 A1* | 1/2008 | Spikes .................. G06Q 20/40 705/40 |
| 2008/0071587 A1 | 3/2008 | Granucci |
| 2008/0071637 A1* | 3/2008 | Saarinen ................ H04W 8/08 705/1.1 |
| 2008/0120127 A1 | 5/2008 | Stoffelsma |
| 2008/0120186 A1 | 5/2008 | Jokinen |
| 2008/0154623 A1 | 6/2008 | Derker |
| 2008/0191009 A1 | 8/2008 | Gressel |
| 2008/0191909 A1 | 8/2008 | Mak |
| 2008/0201212 A1 | 8/2008 | Hammad |
| 2008/0201576 A1 | 8/2008 | Kitagawa |
| 2008/0201769 A1 | 8/2008 | Finn |
| 2008/0227518 A1 | 9/2008 | Wiltshire |
| 2008/0263077 A1 | 10/2008 | Boston |
| 2008/0288302 A1 | 11/2008 | Daouk |
| 2008/0308638 A1 | 12/2008 | Hussey |
| 2009/0055288 A1 | 2/2009 | Nassimi |
| 2009/0088077 A1 | 4/2009 | Brown |
| 2009/0125387 A1 | 5/2009 | Mak |
| 2009/0125407 A1* | 5/2009 | Lee ........................ G06Q 10/02 705/26.1 |
| 2009/0222900 A1 | 9/2009 | Benaloh |
| 2009/0284482 A1 | 11/2009 | Chin |
| 2010/0017872 A1 | 1/2010 | Goertz |
| 2010/0044444 A1 | 2/2010 | Jain |
| 2010/0082491 A1 | 4/2010 | Rosenblatt |
| 2010/0121766 A1 | 5/2010 | Sugaya |
| 2010/0201536 A1 | 8/2010 | Robertson |
| 2010/0211452 A1 | 8/2010 | DAngelo |
| 2010/0219234 A1 | 9/2010 | Forbes |
| 2010/0228563 A1 | 9/2010 | Walker, Jr. |
| 2010/0228576 A1 | 9/2010 | Marti |
| 2010/0253470 A1 | 10/2010 | Burke |
| 2010/0268649 A1 | 10/2010 | Roos |
| 2010/0274691 A1 | 10/2010 | Hammad |
| 2010/0279610 A1 | 11/2010 | Bjorhn |
| 2010/0306718 A1 | 12/2010 | Shim |
| 2010/0308959 A1 | 12/2010 | Schorn |
| 2010/0322485 A1 | 12/2010 | Riddiford |
| 2011/0001603 A1 | 1/2011 | Willis |
| 2011/0040585 A1 | 2/2011 | Roxburgh |
| 2011/0068165 A1 | 3/2011 | Dabosville |
| 2011/0078440 A1 | 3/2011 | Feng |
| 2011/0136472 A1 | 6/2011 | Rector |
| 2011/0153495 A1 | 6/2011 | Dixon |
| 2011/0251910 A1 | 10/2011 | Dimmick |
| 2011/0283241 A1 | 11/2011 | Miller |
| 2011/0307381 A1 | 12/2011 | Kim |
| 2012/0006891 A1 | 1/2012 | Zhou |
| 2012/0030047 A1 | 2/2012 | Fuentes |
| 2012/0092190 A1 | 4/2012 | Stefik |
| 2012/0133484 A1 | 5/2012 | Griffin |
| 2012/0136698 A1 | 5/2012 | Kent |
| 2012/0166298 A1 | 6/2012 | Smith |
| 2012/0245769 A1 | 9/2012 | Creissels |
| 2012/0330697 A1 | 12/2012 | Smith |
| 2013/0103200 A1 | 4/2013 | Tucker |
| 2013/0124236 A1 | 5/2013 | Chen |
| 2013/0194202 A1 | 8/2013 | Moberg |
| 2013/0204647 A1 | 8/2013 | Behun |
| 2013/0214906 A1 | 8/2013 | Wojak |
| 2013/0279757 A1 | 10/2013 | Kephart |
| 2013/0307990 A1 | 11/2013 | Wiles |
| 2014/0086125 A1 | 3/2014 | Polo |
| 2014/0100896 A1 | 4/2014 | Du |
| 2014/0156318 A1 | 6/2014 | Behun |
| 2014/0186050 A1 | 7/2014 | Oshima |
| 2014/0279558 A1 | 9/2014 | Kadi |
| 2015/0025921 A1 | 1/2015 | Smith |
| 2015/0084741 A1 | 3/2015 | Bergdale |
| 2015/0213443 A1 | 7/2015 | Geffon |
| 2015/0213660 A1 | 7/2015 | Bergdale |
| 2015/0317841 A1 | 11/2015 | Karsch |
| 2016/0042631 A1 | 2/2016 | Ho |
| 2016/0055605 A1 | 2/2016 | Kim |
| 2016/0093127 A1 | 3/2016 | Evans |
| 2017/0055157 A1 | 2/2017 | Bergdale |
| 2017/0372289 A1 | 12/2017 | Fitzsimmons |

FOREIGN PATENT DOCUMENTS

| | | | |
|---|---|---|---|
| GB | 2417358 | | 2/2006 |
| GB | 2460240 A | * | 11/2009 ............. G07F 17/42 |
| JP | H11145952 A | | 5/1999 |
| JP | 2003187272 A | | 7/2003 |
| RU | 94931 | | 6/2010 |
| TW | 200825968 A | | 6/2008 |
| WO | 2007139348 A1 | | 12/2007 |
| WO | 2008113355 | | 9/2008 |
| WO | 2009141614 | | 11/2009 |
| WO | WO-2009141614 A1 | * | 11/2009 ........... G06Q 20/045 |
| WO | 2011044899 | | 4/2011 |
| WO | 2014043810 | | 3/2014 |
| WO | 2014189068 | | 11/2014 |
| WO | 2016105322 | | 6/2016 |

OTHER PUBLICATIONS

Railways offer train tickets on cell phone. (Jan. 3, 2011). The Press Trust of India Retrieved from https://dialog.proquest.com/professional/docview/914354674?accountid=131444 (Year: 2011).*

Starnberger et al., "QR-TAN: Secure Mobile Transaction Authentication," area, pp. 578-583, 2009 International Conference on Availability, Reliability and Security, 2009.

Scott Boyter, "Aeritas tried to fill void until 3G wireless is ready; Mobile boarding pass is just one application being tested", all pages, Dallaw Forth Worth TechBiz, Feb. 19, 2001.

Joanna Elachi, "Lufthansa Debuts Barcode Check-in and Boarding", all pages, CommWeb.com, May 25, 2001.

"Aeritas launches secure wireless check-in with barcode", all pages, m-Travel.com, Nov. 9, 2001.

"Aeritas Launches Wireless Check-in and Security Service", all pages, MBusiness Daily, Nov. 8, 2001.

"New Fast Track Wireless Check-In and Security Solution", all pages, aerias.com, retrieved Feb. 5, 2002.

Hussin, W.H.; Coulton, P; Edwards, R., "Mobile ticketing system employing TrustZone technology" Jul. 11-13, 2005.

Jong-Sik Moon; Sun-Ho Lee; Im-Yeong Lee; Sang-Gu Byeon, "Authentication Protocol Using Authorization Ticket in Mobile Network Service Environment" Aug. 11-13, 2010.

(56) References Cited

OTHER PUBLICATIONS

Stephanie Bell, "UK Rail Network to Launch Mobile Train-Ticketing Application" Cardline, Feb. 4, 2011.
Ko Fujimura, Yoshiaki Nakajima, Jun Sekine: "ML Ticket: Generalized Digital Ticket Definition Language" Proceedings of the 3rd Usenix Workshop on Electronic Commerce, Sep. 3, 1998.
Chun-Te Chen; Te Chung Lu, "A mobile ticket validation by VSS teach with timestamp" Mar. 28-31, 2004.
Improvement of urban passenger transport ticketing systems by deploying intelligent transport systems, 2006.
Machine English translation of JP2003-187272A from U.S. Appl. No. 13/901,243.

* cited by examiner

Figure 7

| Venue ID |
|----------|
| Username |
| Password |

METHOD AND SYSTEM FOR DISTRIBUTING ELECTRONIC TICKETS WITH VISUAL DISPLAY FOR VERIFICATION

FIELD OF INVENTION

This application is a continuation of application Ser. No. 13/110,709 filed May 18, 2011, the entire contents of which are incorporated herein by reference. This invention provides a mechanism whereby a venue or other facility that meters usage by means of tickets can distribute tickets electronically and use a visual aid on an electronic device to visually confirm that a person is a valid ticket holder.

BACKGROUND

Venues such as theaters, amusement parks and other facilities that use tickets, for example airlines, ferries and other transportation have a need to use electronic ticketing. Existing systems distribute information that can constitute a ticket, but the verification problem is difficult. In one example of prior art, an electronic ticket is displayed as a bar-code on the recipient's telephone display screen. The telephone is then placed on a scanner that reads the bar-code in order to verify the ticket. The problem with these systems is that the scanning process is fraught with error and the time taken to verify the electronic ticket far exceeds that of the old system: looking at the paper ticket and tearing it in half. Barcode scanners were not designed to read a lit LCD screen displaying a bar code. The reflectivity of the screen can defeat the scanning process. Therefore, there is a need for an electronic ticketing system that provides a human-perceivable visual display that the venue can rely on to verify the ticket. This invention provides for the distribution of an electronic ticket that also contains a visual display that ticket takers can rely on as verification, without using a scanning device.

DESCRIPTION OF THE FIGURES

1. Basic architecture.
2. Flow chart for ticket purchase.
3. Flow chart for displaying the verifying visual object.
4. Example validating visual object.
5. Example validating visual object
6. Schematic of event database record.
7. Schematic of authorized user database record.
8. Flow chart for transfer of ticket.
9. Example user interface on user's device.
10. Example user interface showing activation selection screen.
11. Example user interface showing display of validating visual object and other ticketing information.
12. Schematic of basic authorization protocol.

DETAILED DESCRIPTION OF THE PREFERRED EMBODIMENTS

Figure 1:
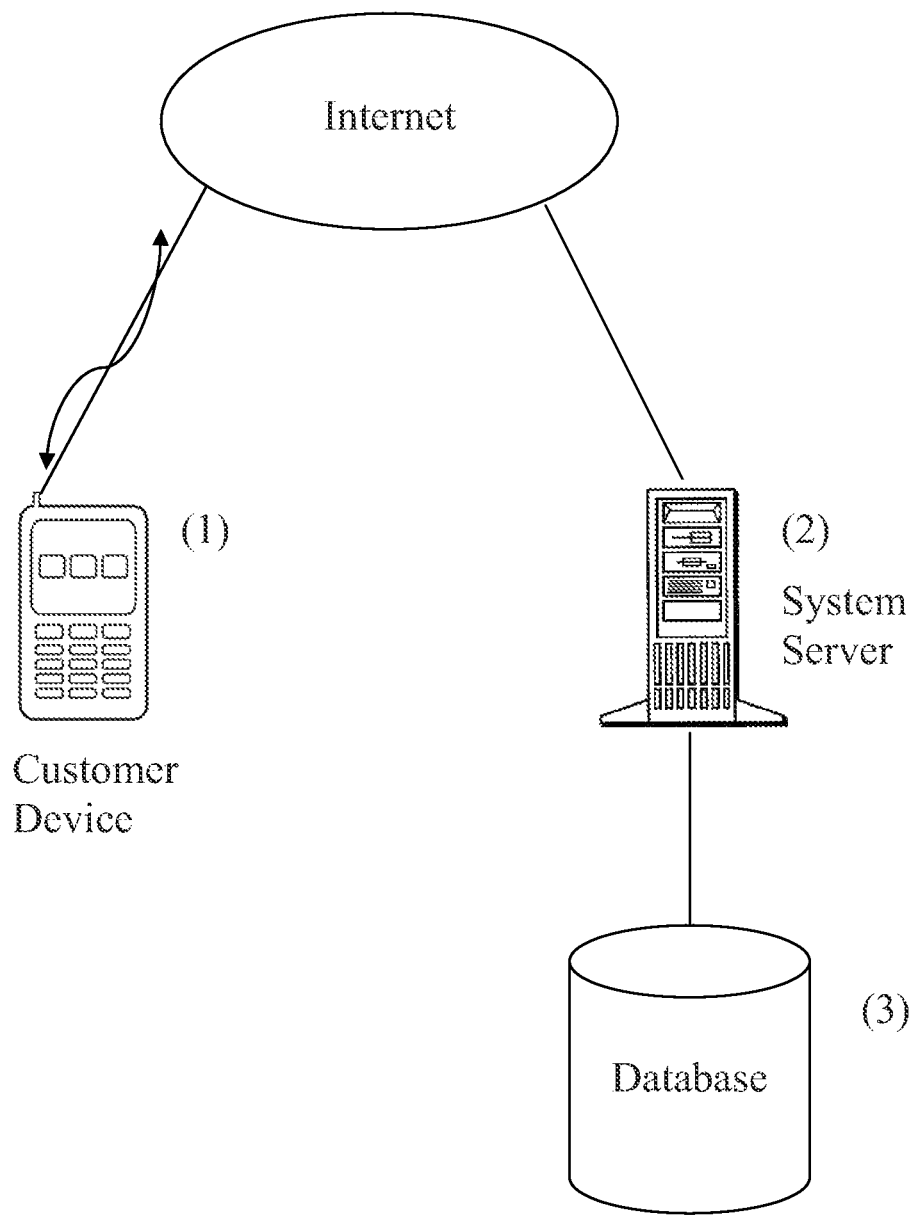
Figure 2:
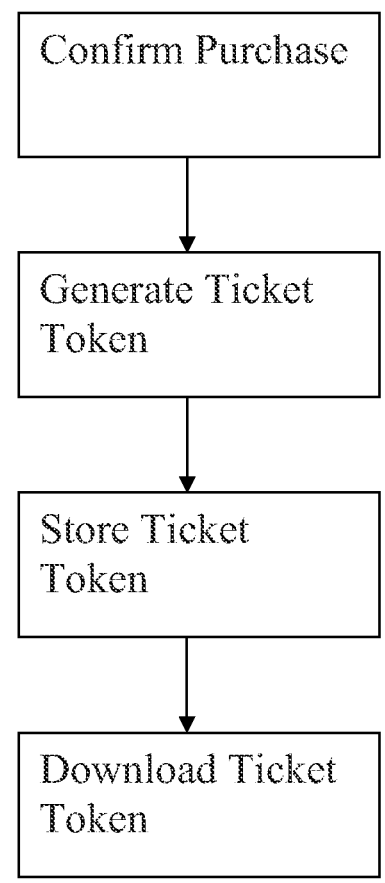
Figure 3:
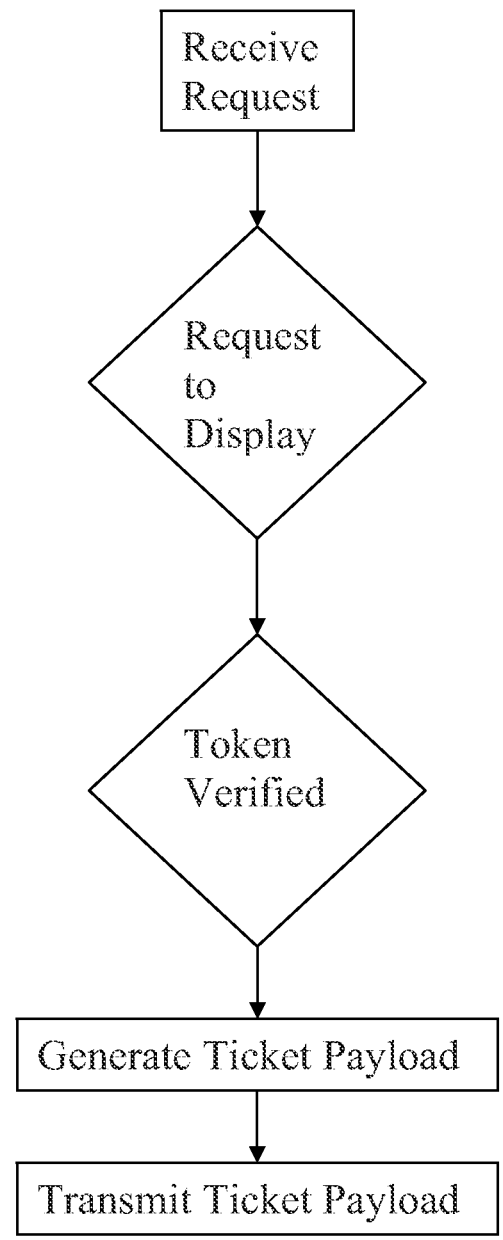
Figure 4:
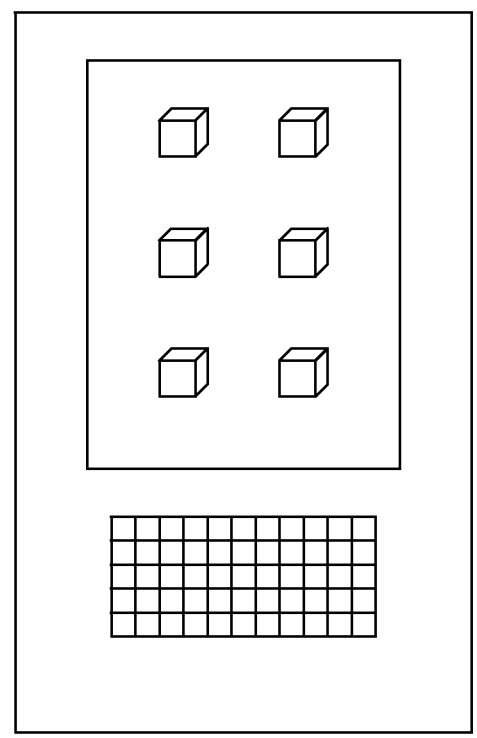
Figure 5:
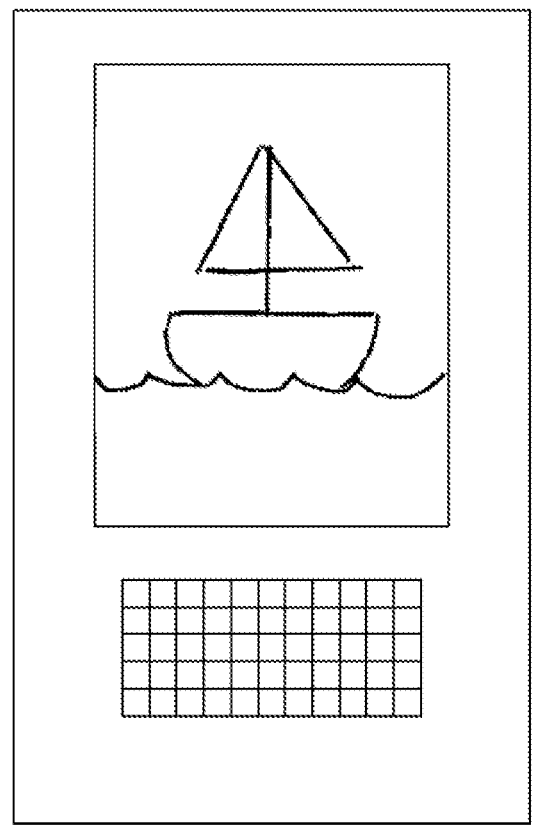

The system operates on one or more computers, typically one or more file servers connected to the Internet and also on a customer's computing device. A customer's device can be a personal computer, mobile phone, mobile handheld device like a Blackberry' or iPhone' or any other kind of computing device a user can use to send and receive data messages. The customer's device is used to display the validating visual object.

Conventional electronic tickets display a barcode or QR code on a user's telephone, typically a cellphone or other portable wireless device with a display screen. The problem with this approach is that a barcode scanner has to be used by the ticket taker. Barcode scanners are not highly compatible with LCD screen displays of barcodes. The amount of time that it takes to process an electronic ticket is greater than that of a paper ticket. Sometimes the LCD display does not scan at all and a passenger has to be sent away to get a paper printout of a ticket. Given the potential large crowds that often attend open venues, this is impractical.

In this invention, the ticket is procured electronically and stored on the user's device. However, when the ticket is to be taken the verification is determined by a larger visual object that a human can perceive without a machine scanning it. The particular validating visual object chosen can be constantly changed so that the ticket taker does not have to be concerned that a device displaying the designated validating visual object is invalid. There are many types of visual objects that can be displayed that are easily recognized by a ticket taker. These can include but are not limited to: Patterns of color change, Animations and Geometric patterns.

In one embodiment of the invention, the user purchases a ticket from an on-line website. The website sends to the user's device a unique number, referred to as a token. The token is also stored in the ticketing database. When the time comes to present the ticket, the venue can select what visual indicator will be used as the designated validation visual object. The user can then request the validation visual object. The user's device will have an application that launches a user interface. The user can select "validate" or some other equivalent command to cause the application to fetch and download from the ticketing system a data object referred to herein as a ticket payload, which includes a program to run on the user's device. In another embodiment, the ticket payload can be pushed to the device by the venue. As a result, the application transmitted to the user's device is previously unknown to the user and not resident in the user's device. At that point the user's device can execute the program embodied in the ticket payload, which causes the validation visual object to be displayed on the user's device. The ticket taker knows what the validating visual object is, and simply looks to see that the user's device is displaying the correct visual object.

Piracy is limited in several ways. First, the ticket holder and their device does not have access to the validating visual object until a time select to be close to the point in time where the ticket has to be presented. Second, the validating visual object is one of an very large number of permutations and therefore cannot be guessed, selected or copied ahead of time. Third, the ticket payload can contain code that destroys the validating visual object in a pre-determined period of time after initial display or upon some pre-determined input event. Fourth, a number of security protocols can be utilized to ensure that a copy of the application that executes to display the validating visual object cannot be readily copied or reverse engineered.

Validating Visual Object Displays:

There many kinds of validation displays that can be utilized. The criterion for what constitutes a validating visual object is one that is readily recognizable from human observation, is encapsulated in such a way as to be transmitted to the customer's device with a minimum of network latency or download time, and that can be reasonably secured so as to avoid piracy. Barcodes and similar codes like the QR code are not validating visual objects because a person looking at them cannot tell one apart from another. Instead, the person has to rely on a barcode scanner and computing device to verify the barcode.

In one embodiment, the period that a particular validating visual object may be used is automatically limited. Examples of validating visual objects include:
1. A color display on the device.
2. A color sequence.
3. An animation that is easily recognized.
4. Animations can include easily recognizable geometric patterns, for example an array of diamonds, or an array of rotating cubes.
5. A human recognizable image.
6. The customer's face as an image.
7. Combinations of the above.

In another embodiment, other images, for example, block letter, can be displayed so that additional information readily apparent to the ticket taker is displayed. For example, a letter can be designated for a Child ticket or a different letter for an Adult ticket.

Figure 7:
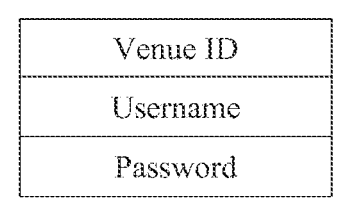

Referring now to FIG. 1, the customer uses their device (1) to purchase a ticket from the service operating the system server (2) and database (3). In one embodiment, an authorized user associated with the venue, typically the box office manager, logs into the back-end system through a secure web-page. The authorized user can enter the web-page by entering a username, password and venue identifier. The system maintains a database (3) that associates the venue identifier with a set of usernames and password pairs that are authorized to use the system on behalf of the venue. See FIG. 7. The system checks the database (3) to verify that the venue ID, username and password are consistent with each other. The authorized user can navigate through to a point in the system user interface where a particular show may be selected for ticket taking. The user selects the upcoming show, and then selects from a display of possible validating visual objects. The validating visual object is transmitted to a device viewable by ticket taking staff at the entrances to the venue. The staff then can see the authorized object to accept for the upcoming show.

Figure 6:
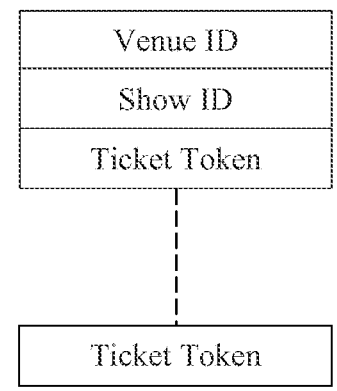
Figure 8:
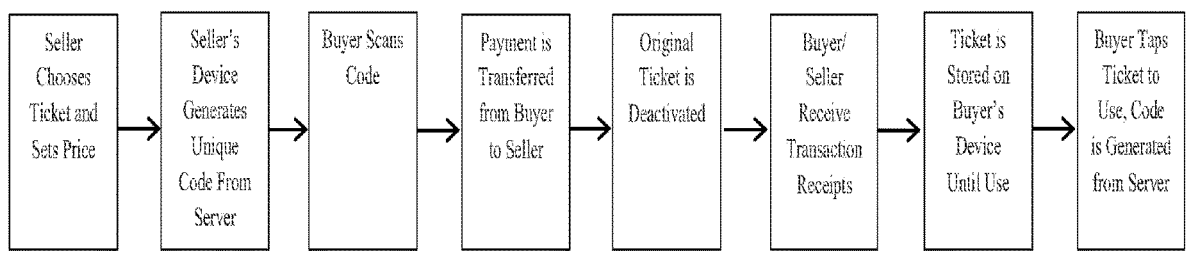

Ticket holders that have purchased tickets have a data record in the system database that contains the unique token associated with the ticket and other relevant information, including the venueID and an identifier identifying the specific show the ticket is for. See FIG. 6. At the entrance, customers are requested to operate an application on their devices. This application fetches the stored ticket token and transmits that token to the system, preferably over a secure data channel. The database looks up the token to check that the token is valid for the upcoming show. If the token is valid, then the system transmits back to the device a ticket payload. The ticket payload contains computer code that, when operated, displays the selected validating visual object.

Figure 9:
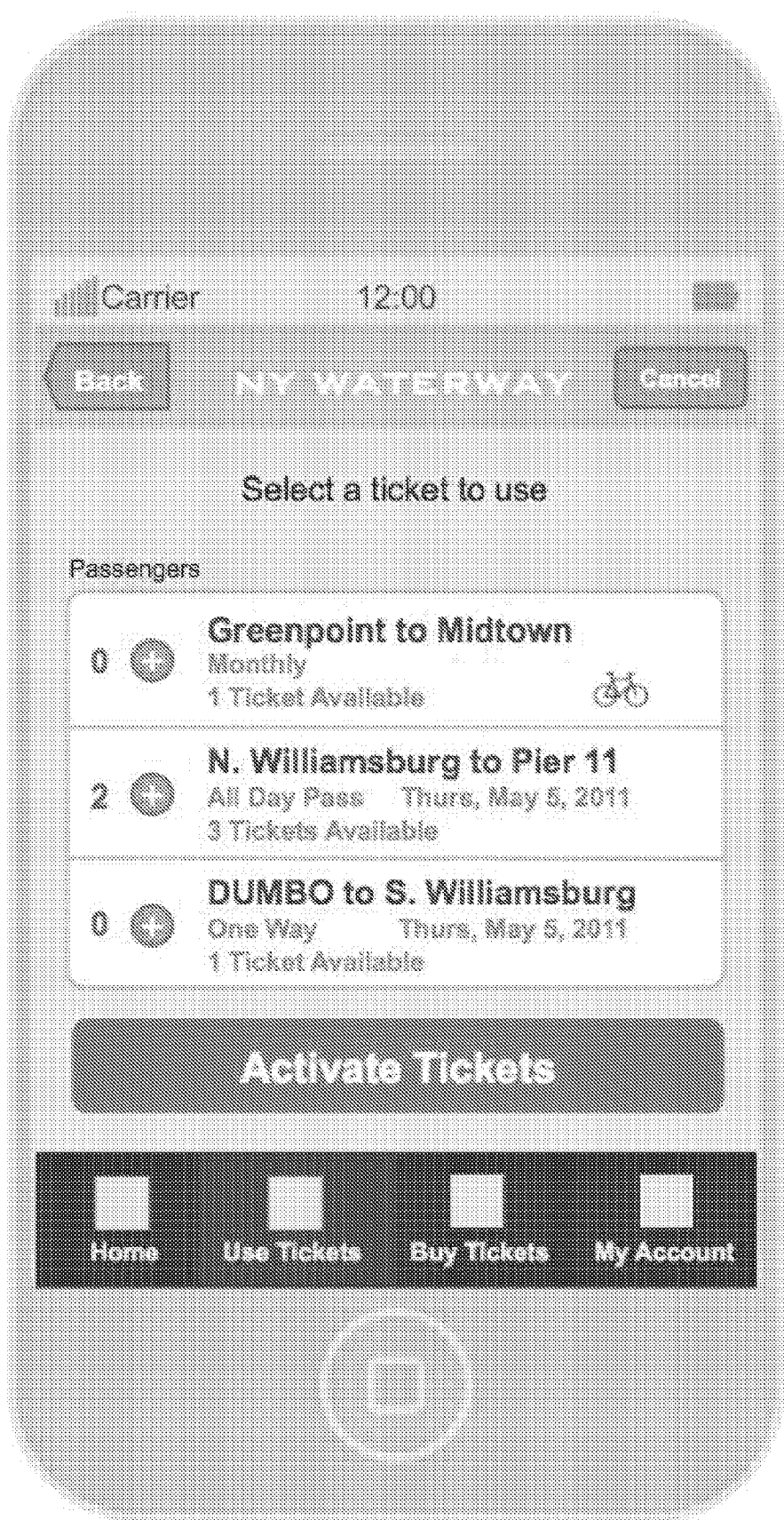
Figure 10:
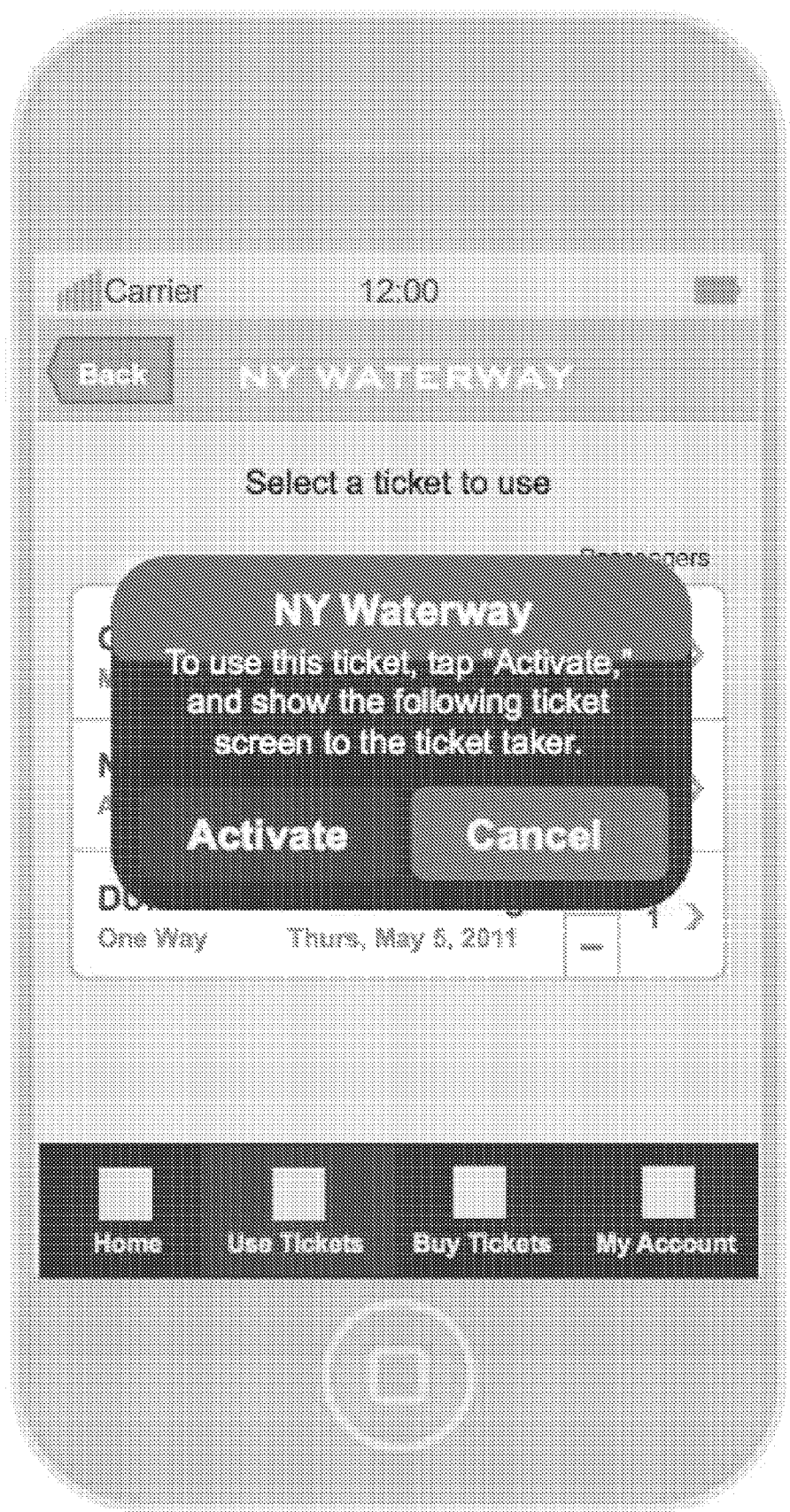
Figure 11:
Figure 12:
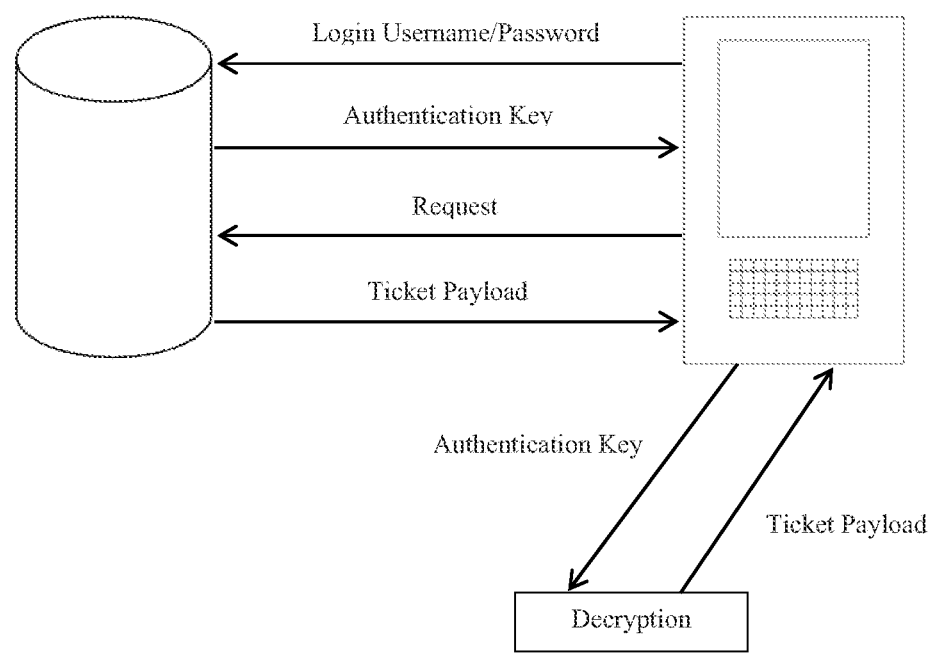

The customer can navigate the user interface of the application in order to cause the application to request whether to display the validating visual object. As shown in FIG. 9, one or more available tickets can be displayed on the user interface, which provides the user the ability to select one of the tickets. When the customer properly actuates the user interface, for example, by actuating the "Activate Tickets" button (see FIG. 10), the validating visual object is displayed on the screen of the device. The animation can be presented along with other ticketing information (see FIG. 11). In one embodiment, the device transmits the ticket token to the system with a command indicating that the ticket has been used. In another embodiment, the customer can operate the application and request that the application transmit to the database the condition that the ticket was used. In that embodiment, the user can input a numeric code or password that the application uses to verify that the customer is confirming use of the ticket. In yet another embodiment, after the validating visual object has been launched, a predetermined amount of time later it can be deemed used. At that time, the application can cause the color of the object to be changed so that it indicates that there was a valid ticket, but the ticket was used. This condition is useful in cases where the venue checks tickets during shows while letting customers move around the venue's facilities.

In another embodiment, the purchase of the ticket causes the ticket payload to be downloaded to the customer's device. Likewise, the authorized user for the venue will select a validating visual object for a particular show well in advance of the show. In this case, because a customer may possess the payload some time before its use, precautions must be taken to secure the ticket payload from being hacked so that any similar device can display the validating visual object. While this is a security tradeoff, the benefit is that the customer need not have an Internet connection at a time close to the showtime of the venue.

The use of electronic ticketing provides opportunities that change how tickets can be bought and sold. For example a first customer can purchase a ticket and receive on their device a ticket token. A second customer can purchase that ticket using the system. The first customer can use the application to send a message to the system server indicating that the first customer intends to the web-page indicating that it wants to buy that particular ticket. The system can ask the first customer for a username and password to be associated with the first customer's ticket. If the second customer identifies the first customer's username, the system then can match the two together. At that point, the data record associated with the first customer's ticket is modified so that the ticket token value is changed to a new value. That new ticket token value is then transmitted to the second customer's device. At the same time, the system can operate a typical on-line payment and credit system that secures payment from the second customer and credits the first customer. In one embodiment, the system pays the first customer a discounted amount, retaining the balance as a fee.

In yet another embodiment, the first customer may be unknown to the second customer. In that embodiment, the first customer simply may indicate to the system, through a message transmitted from the application operating on the device or directly through a web-page, that the first customer is not going to use the ticket and wishes to sell it. At that point, the system can mark the data record associated with the ticket as "available for sale." When the second customer makes a request to purchase a ticket for the same show, the system creates a new ticket token for the second customer and updates the ticket token stored in the data record.

In a general admission type of scenario, the ticketing database is simple: each show has a venue ID, some identifier associated with the show itself, various time indicators, the selected validating visual object, and a list of valid ticket tokens. In a reserved seating arrangement, the ticketing database has a data record associated with a show, as indicated by a show identifier, but each seat has a data record that has a unique show identifier and ticket token, which includes the identity of the seat itself.

In the preferred embodiment, the validating visual object is secured against tampering. One threat model is that a customer who has received a ticket payload would then take the data file comprising the ticket payload and analyze it to detect the actual program code that when executed, produces the validating visual object on the display screen of the device. Once that has been accomplished, the would-be pirate can then re-package the code without any security mechanism and readily distribute it to other device owners, or even cross-compile it to execute on other types of display devices. The preferred embodiment addresses this threat model in a number of ways.

First, the ticket payload can be secured in a region of the device under the control of the telecommunications provider. In this case, the customer cannot access the code comprising the ticket payload. In another embodiment, the ticket payload can be encrypted in such a way that the only decrypting key available is in the secure portion of the telecommunications device. In that embodiment, the key is only delivered when an application running on the secure part of the device confirms that the ticket payload that is executing has not been tampered with, for example, by checking the checksum of its run-time image. At that point, the key can be delivered to the ticket payload process so that the validating visual object is displayed on the device.

Second, the selected animation is packaged for each device. That is, the code that operates to display the validating visual object itself operates certain security protocols. The phone transmits a ticket transaction request. The request includes a numeric value unique to the device, for example, an IMEI number. Other embodiments use the UDID or hardware serial number of the device instead of or in combination with the IMEI number. The system server then generates the ticket token using the IMEI number and transmits that value to that device. In addition, the ticket payload is created such that it expects to read the correct IMEI number. This is accomplished by the system server changing portions of the ticket payload so that the it is customized for each individual IMEI number associated with a ticket token. The animation code comprising the ticket payload is designed so that it has to obtain the correct IMEI number at run time. In another embodiment, at run-time, the animation code will read the particular ticket token specific for the phone that instance of the animation was transmitted to. The code will then decode the token and check that it reflects the correct IMEI number for that device.

In another embodiment, the security protocol first requires the user to login to the server with a login username and password. The application also transmits the IMEI, UDID or serial number of the device or any combination of them. When verified by the server, an authorization key (Authkey) is transmitted to the device. The Authkey is a random number. When the user's application transmits a request for a validating visual object, it transmits the Authkey and the IMEI, UDID or serial number (or combination) that is used for verification. This is checked by the server for validity in the database. On verification, the validating visual object is encrypted using the .Authkey and transmitted to the device. The application running on the device then uses the Authkey to decrypt and display the validating visual object. The .Authkey is a one-time key. It is used once for each ticket payload. If a user buys a second ticket from the system, a different, second Authkey is associated with that second ticket payload. In one embodiment, the Authkey is unique to the ticket for a given event. In another embodiment, the Authkey is unique to the ticket, device and the event. In other embodiments, the Authkey can be replaced with a key-pair in an asymmetric encryption system. In that case, the validating visual object is encrypted with a "public"key, and then each user is issued a private key as the "Authkey" to be used to decrypt the object.

In yet another embodiment, the Authkey can be encrypted on the server and transmitted to the device in encrypted form. Only when the application is operating can the Authkey be decrypted with the appropriate key. In yet another embodiment, the application that displays the validating visual object can request a PIN number or some other login password from the user, such that if the device is lost, the tickets cannot be used by someone who finds the device.

In another embodiment, the application running on the device can fetch a dynamic script, meaning a piece of code that has instructions arranged in a different order for subsets of devices that request it. The ticket payload is then modified so as to have the same number of versions that are compatible with a corresponding variation in the dynamic script. As a result, it is difficult to reverse engineer the application because the application will be altered at run time and the ticket payload customized for that alteration. One embodiment of the dynamic script would be expressed in Java™ computer language and rendered using OpenView. The ticket payload can be an HTML file called using Ajax.

Security can also be enhanced by actively destroying the validating visual object so that it resides in the device for a limited time. In one embodiment, the ticket payload has a time to kill parameter that provides the application with a count-down time to destroy the validating visual object. In another embodiment, the validating visual object is displayed when the user holds down a literal or virtual button on the user interface of the device. When the button is released, the application destroys the validating visual object. Security can also be enhanced by retaining as steganographic data embedded in the validating visual object, the IMEI, UDID, Serial number or phone number of the device. The application can be operated to recover that information and display it on the screen. This makes it possible for security personnel at a venue to view that information from a validly operating device. If the device is showing a pirated validating visual object, then the actual data associated with the device will not match and it will be apparent from inspection of the device. This way, suspicious ticket holders can be subject to increased scrutiny, the presence of which deters piracy.

In another embodiment, the ticket payload can operate a sound sampling application that requests the customer to speak in to the device. The application can then use that data to check whether the voice print of the speaker matches the expected voice print. In yet another embodiment, the device can take a picture of the customer's face, and then facial recognition code embedded in the ticket payload can operate to check whether the features of the face sufficiently match a pre-determined set of features, that is, of the customer's face at the time the ticket was purchased. In yet another embodiment, the verification can be supplemented by being sure that the use of the ticket is during a pre-determined period of time. In yet another embodiment, the verification can be supplemented by the ticket payload operating to check that the location of the venue where the ticket is being used is within a pre-determined range of tolerance to a GPS (Global Positioning System) location. In yet another embodiment, after a certain pre-determined number of downloads of ticket payloads for a specific show, the validating visual object is automatically changed. This last mechanism may be used for promotions, to select the first set of ticket buyers for special treatment at the venue. In yet another embodiment, two different validating visual objects may be used, which are selected based on the verified age of the customer. In this way, a venue can use the system to not only to verify ticket holders coming into the venue, but to verify their drinking age when alcoholic drinks are ordered.

Operating Environment: The system operates on one or more computers, typically one or more file servers connected to the Internet. The system is typically comprised of a central server that is connected by a data network to a user's computer. The central server may be comprised of one or more computers connected to one or more mass storage devices. A website is a central server that is connected to the Internet. The typical website has one or more files, referred to as web-pages, that are transmitted to a user's computer so that the user's computer displays an interface in dependence on the contents of the web-page file. The web-page file can contain HTML or other data that is rendered by a program operating on the user's computer. That program, referred to as a browser, permits the user to actuate virtual buttons or controls that are displayed by the browser and to input alphanumeric data. The browser operating on the user's computer then transmits values associated with the buttons or other controls and any input alphanumeric strings to the website. The website then processes these inputs, in some cases transmitting back to the user's computer additional data that is displayed by the browser. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive webpage operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, I-ITTP, SMTP, RPC, PIP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (10) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed is:

1. A method of displaying a validating visual object, wherein the method is executed by a computer system comprised of a mobile device comprised of a display screen connected by a data network to a server, said method comprising:

receiving at the server a selected visual indicator to provide the validating visual object;

storing the selected visual indicator in a data record associated with a purchased ticket, wherein the data record associated with the purchased ticket contains a unique token associated with the purchased ticket;

displaying the purchased ticket on the display screen of the mobile device as a first display;

fetching the unique token associated with the purchased ticket over a data channel by the mobile device;

transmitting the unique token associated with the purchased ticket from the mobile device to a system with a database, wherein the system with the database checks that the unique token associated with the purchased ticket is valid and upon confirmation that the unique token is valid transmits back to the mobile device a ticket payload, wherein the ticket payload contains computer code that, when executed, causes the validating visual object to be displayed on the display screen of the mobile device as a second display replacing the first display;

receiving a dynamic script code as part of the ticket payload;

altering the computer code that causes the validating visual object to be displayed on the display screen using the received dynamic script code;

requiring a user of the mobile device to input into the mobile device, through a user interface displayed on the display screen of the mobile device, an entry code associated with the user;

in response to reception of the entry code, providing a payload-specific input key that permits the altered computer code to execute in order to display the validating visual object;

further requiring the user to provide a user-specific Personal Identification Number (PIN); and executing the altered computer code to generate the second display containing the validating visual object only upon successful verification that the payload-specific input key is associated with the received ticket payload and that the user-specific PIN is correct;

wherein the validating visual object is displayed when the user holds down a button on the user interface of the mobile device and is destroyed when the button is released by the user.

2. The method of claim 1, further comprising:

destroying the ticket payload after a pre-determined period of time has expired since the validating visual object was displayed a first time on the mobile device.

3. The method of claim 1, further comprising:

extracting additional embedded information within the ticket payload and displaying that additional embedded information on the display screen of the mobile device.

4. The method of claim 1, further comprising: determining that the executed computer code that causes the validating visual object to be displayed on the display screen has not been tampered.

5. The method of claim 1, further comprising: determining that the ticket payload has not been tampered.

6. The method of either of claim 1, further comprising:

receiving a decryption key; and decrypting the ticket payload using the decryption key in order to obtain the validating visual object.

7. The method of claim 6, where the decryption key is a private key uniquely associated with the mobile device and associated with a public key used to encrypt the ticket payload.

8. The method of claim 6, further comprising:

detecting that the decryption key is valid for the mobile device.

9. The method of claim 6, wherein the decryption key is stored in a secure portion of the mobile device that is under the control of a telecommunications provider.

10. The method of claim 1, further comprising:

receiving as input into the mobile device, through the user interface, biometric data associated with the user of the mobile device that permits the altered computer code to operate to display the validating visual object when the input biometric data is verified to be associated with the received ticket payload and to prohibit such operation in the absence of such verification.

11. The method of claim 10, further comprising determining that the biometric data is verified to be the user's face.

12. The method of claim 10, further comprising determining that the biometric data is verified to be the user's voice.

13. The method of claim 1, further comprising:

receiving from the mobile device data representing a current location of the mobile device to thereby provide received location data;

determining whether the received location data is within a pre-determined area associated with a specific use; and upon determining the received location data is within the pre-determined area associated with the specific use, transmitting to the mobile device a command to display the validating visual object.

14. The method of claim 13, wherein the receiving step is further comprised of obtaining location data from a GPS module.

15. The method of claim 1, further comprising:

determining that a pre-determined time period associated with the ticket payload has not expired and permitting the display of the validating visual object.

16. The method of claim 1, further comprising:

receiving data representing a pre-determined expiration time associated with the ticket payload and prohibiting the display of the validating visual object after the pre-determined expiration time.

17. The method of claim 1, further comprising:

receiving data representing a pre-determined ticket type associated with the ticket payload and in dependence on such pre-determined ticket type data, causing the display of the validating visual object to indicate the pre-determined ticket type.

18. The method of claim 17, wherein the pre-determined ticket type is one of adult or child.

19. The method of claim 1, further comprising the steps of:

associating the selected validating visual object with an event to provide an associated event; and verifying that the purchased ticket is for the associated event.

20. The method of claim 1, further comprising the step of:

transmitting the validating visual object to a remote device that is distinct from the mobile device that fetched the unique token.

21. The method of claim 1, further comprising the step of transmitting an authorization key to the mobile device that fetched the unique token.

22. The method of claim 21, further comprising the step of encrypting the ticket payload using the authorization key.

23. The method of claim 22, further comprising the step of encrypting the ticket payload with a public key for which the transmitted authorization key is the associated private key.

24. The method of claim 1, further comprising the step of;

transmitting to the server a request to obtain the purchased ticket which is represented by the ticket payload so as to cause the server to execute a transaction that modifies the data record corresponding to the purchased ticket that indicates that the ticket was purchased already by another purchaser in order to associate the ticket with the user of the mobile device displaying the validating visual object and with the mobile device itself.

25. The method of claim 1, further comprising transmitting to the server a data message representing a condition that the ticket payload has been used to cause the data record associated with the purchased ticket residing on the server to be updated to indicate a used status.

26. A method of displaying a validating visual object, wherein the method is executed by a computer device comprised of a display screen and connected by a data network to a server, said object being pre-selected to correspond to a specific use, said method comprising:

receiving at the server a selected visual indicator to provide the validating visual object;

storing the selected visual indicator in a data record associated with a purchased ticket, wherein the data record associated with the purchased ticket contains a unique token associated with the purchased ticket;

displaying the purchased ticket on the display screen of the computer device as a first display;

fetching the unique token associated with the purchased ticket over a data channel, by the computer device;

transmitting the unique token associated with the purchased ticket to a system with a database, wherein the system with the database checks that the unique token associated with the purchased ticket is valid and upon confirmation that the unique token is valid transmits back to the computer device a ticket payload, wherein the ticket payload contains computer code that, when executed, causes the validating visual object to be displayed on the display screen of the computer device as a second display replacing the first display;

receiving a dynamic script code as part of the ticket payload;

altering the computer code that causes the validating visual object to be displayed on the display screen using the received dynamic script code;

requiring a user of the computer device to input into the computer device, through a user interface displayed on the display screen of the computer device, an entry code associated with the user;

in response to reception of the entry code, providing a payload-specific input key that permits the altered computer code to execute in order to display the validating visual object;

further requiring the user to provide a user-specific Personal Identification Number (PIN);

executing the altered computer code to generate the second display containing the validating visual object only upon successful verification that the payload-specific input key is associated with the received ticket payload and that the user-specific PIN is correct; and displaying the validating visual object when the user holds down a button on the user interface of the computer device and destroying the displayed validating visual object when the button is released by the user.

27. The method of claim 26, further comprising the step of:
destroying the ticket payload after a pre-determined period of time has expired since the validating visual object was displayed a first time on the computer device.

28. The method of claim 26, further comprising the steps of:
extracting additional embedded information within the ticket payload and displaying that additional embedded information on the display screen of the computer device.

29. The method of claim 26, further comprising the step of:
determining that the executed computer code that causes the validating visual object to be displayed on the display screen has not been tampered.

30. The method of claim 26, further comprising the step of:
determining that the ticket payload has not been tampered.

31. The method of claim 26, further comprising:
receiving a decryption key; and
decrypting the ticket payload using the decryption key in order to obtain the validating visual object.

32. The method of claim 31, wherein the decryption key is a private key uniquely associated with the computer device and associated with a public key used to encrypt the ticket payload.

33. The method of claim 31 further comprising:
detecting that the decryption key is valid for the computer device.

34. The method of claim 26 further comprising:
receiving as input into the computer device, through the user interface, biometric data associated with the user of the computer device that permits the altered computer code to operate in order to display the validating visual object when the input biometric data is verified to be associated with the received ticket payload and to prohibit such operation in the absence of such verification.

35. The method of claim 34, further comprising determining that the biometric data is verified to be the user's face.

36. The method of claim 34, further comprising determining that the biometric data is verified to be the user's voice.

37. The method of claim 26, further comprising:
receiving from the computer device data representing a current location of the computer device to thereby provide received location data;
determining whether the received location data is within a pre-determined area associated with the specific use; and
upon determining the received location data is within the pre-determined area associated with the specific use, transmitting to the computer device a command to display the validating visual object.

38. The method of claim 37, wherein the receiving step is further comprised of obtaining location data from a GPS module.

39. The method of claim 26, further comprising the steps of:
determining that a pre-determined time period associated with the ticket payload has not expired and permitting the display of the validating visual object.

40. The method of claim 26, further comprising the steps of:
receiving data representing a pre-determined expiration time associated with the ticket payload and prohibiting the display of the validating visual object after the pre-determined expiration time.

41. The method of claim 26, further comprising:
receiving data representing a pre-determined ticket type associated with the ticket payload and in dependence on such pre-determined ticket type data, causing the display of the validating visual object to indicate the pre-determined ticket type.

42. The method of claim 41, where the pre-determined ticket type is one of adult or child.

43. The method of claim 26, further comprising: opening a push data channel from a system comprised of a ticket storage server to the user's computer device so as to cause the ticket payload to be transmitted through the push data channel in a manner so that the ticket payload is not resident on the user's computer device.

44. The method of claim 26 further comprising the step of:
transmitting to the server a request to obtain the purchased ticket which is represented by the ticket payload so as to cause the server to execute a transaction that modifies the data record corresponding to the purchased ticket that indicates that the ticket was purchased already by another purchaser in order to associate the ticket with the user of the computer device displaying the validating visual object and with the computer device itself.

45. The method of claim 44, further comprising:
receiving at the server from the another purchaser a command authorizing the transfer of the ticket to the user of the device.

46. The method of claim 44, further comprising:
exchanging an indicia of identity associated with the another purchaser that is stored in the data record with an indicia of identity associated with the user of the device.

47. The method of claim 26, further comprising transmitting to the server a data message representing a condition that the ticket payload has been used for the specific use in order to cause the data record associated with the purchased ticket residing on the server to be updated to indicate a used status.

48. A system comprised of a mobile device comprised of a display screen connected by a data network to a server adapted to display a validating visual object, said system comprising:
the server, wherein the server receives a selected visual indicator to provide the validating visual object;
a data record associated with a purchased ticket containing a unique token associated with the purchased ticket, and wherein the selected visual indicator is stored in the data record; and
the mobile device, wherein the mobile device fetches the unique token over a data channel and transmits the unique token to a system with a database, and wherein the mobile device displays the purchased ticket on the display screen of the mobile device as a first display;
wherein the system with the database checks the unique token associated with the purchased ticket is valid and upon confirmation that the unique token is valid transmits back to the mobile device a ticket payload, wherein the ticket payload contains computer code that, when executed, causes the validating visual object to be displayed on the display screen of the mobile device as a second display replacing the first display,
wherein the mobile device performs the following:
receives a dynamic script code as part of the ticket payload and alters the computer code that causes the validating visual object to be displayed on the display screen using the received dynamic script code,
requires a user of the mobile device to input into the mobile device, through a user interface displayed on the display screen of the mobile device, an entry code associated with the user,
in response to reception of the entry code, provides a payload-specific input key that permits the altered computer code to execute in order to display the validating visual object,
further requires the user to provide a user-specific Personal Identification Number (PIN), and
executes the altered computer code to generate the second display containing the validating visual object only upon successful verification that the payload-specific input key is associated with the received ticket payload and that the user-specific PIN is correct, and
wherein the validating visual object is displayed when the user holds down a button on the user interface of the mobile device and is destroyed when the button is released by the user.

49. A non-transitory computer data storage device comprised of computer data representing a computer program that when executed, causes a system comprised of a mobile device comprised of a display screen connected by a data network to a server to perform a method of displaying a validating visual object, said method comprising:
receiving at the server a selected visual indicator to provide the validating visual object;
storing the selected visual indicator in a data record associated with a purchased ticket, wherein the data record associated with the purchased ticket contains a unique token associated with the purchased ticket;
displaying the purchased ticket on the display screen of the mobile device as a first display;
fetching the unique token associated with the purchased ticket over a secure data channel by a the mobile device;
transmitting the unique token to a system with a database, wherein the system with the database checks that the unique token associated with the purchased ticket is valid and upon confirmation that the unique token is valid transmits back to the mobile device a ticket payload, wherein the ticket payload contains computer code that, when executed, causes the validating visual object to be displayed on the display screen of the mobile device as a second display replacing the first display, wherein the ticket payload is adapted to be usable only on the receiving mobile device;
receiving a dynamic script code as part of the ticket payload;
altering the computer code that causes the validating visual object to be displayed on the display screen using the received dynamic script code;
requiring a user of the mobile device to input into the mobile device, through a user interface displayed on the display screen of the mobile device, an entry code associated with the user;
in response to reception of the entry code, providing a payload-specific input key that permits the altered computer code to execute in order to display the validating visual object;
further requiring the user to provide a user-specific Personal Identification Number (PIN); and
executing the altered computer code to generate the second display containing the validating visual object only upon successful verification that the payload-specific input key is associated with the received ticket payload and that the user-specific PIN is correct;
wherein the validating visual object is displayed when the user holds down a button on the user interface of the mobile device and is destroyed when the button is released by the user.

50. A non-transitory computer data storage device comprised of computer data representing a computer program that, when executed, causes a system comprised of a server connected by a data network to a computer device comprised of a display screen to perform a method of displaying a validating visual object, said object being pre-selected to correspond to a specific use, said method comprising:
receiving at the server a selected visual indicator to provide the validating visual object;
storing the visual indicator in a data record associated with a purchased ticket wherein the data record associated with the purchased ticket contains a unique token associated with the purchased ticket;
displaying the purchased ticket on the display screen of the computer device as a first display;
fetching the unique token associated with the purchased ticket over a secure data channel, by the computer device;
transmitting the unique token to a system with a database, wherein the system with the database checks that the unique token associated with the purchased ticket is valid and upon confirmation that the unique token is valid transmits back to the computer device a ticket payload, wherein the ticket payload contains computer code that, when executed, causes the validating visual object to be displayed on the display screen of the computer device as a second display replacing the first display;

receiving a dynamic script code as part of the ticket payload;

altering the computer code that causes the validating visual object to be displayed on the display screen using the received dynamic script code;

requiring a user of the computer device to input into the computer device, through a user interface displayed on the display screen of the computer device, an entry code associated with the user;

in response to reception of the entry code, providing a payload-specific input key that permits the altered computer code to execute in order to display the validating visual object;

further requiring the user to provide a user-specific Personal Identification Number (PIN); and executing the altered computer code to generate the second display containing the validating visual object only upon successful verification that the payload-specific input key is associated with the received ticket payload and that the user-specific PIN is correct;

wherein the validating visual object is displayed when the user holds down a button on the user interface of the computer device and is destroyed when the button is released by the user.

* * * * *